United States Patent [19]

Young, deceased et al.

[11] 3,775,165

[45] Nov. 27, 1973

[54] POLYMERS OF IMPROVED FLAME RETARDANCE

[75] Inventors: Freeman M. Young, deceased, late of Spartanburg, S.C. by Mary M. Young, administratrix; Michael V. Lock, Spartanburg, S.C.

[73] Assignee: Deering Milliken Research Corporation, Spartanburg, S.C. ; by said Lock

[22] Filed: July 19, 1971

[21] Appl. No.: 164,011

Related U.S. Application Data

[63] Continuation-in-part of Ser. No. 854,777, Sept. 2, 1969, abandoned.

[52] U.S. Cl. .......................... 117/136, 8/171, 8/173, 117/138.8 F, 260/45.85 R, 260/45.85 T, 260/45.7 P
[51] Int. Cl. ............................................ C08g 51/58
[58] Field of Search .............. 260/45.85 R, 45.85 T, 260/75 P, 75 H, 93.7, 45.7 P; 106/15; 117/138.8 F, 136; 8/171, 173

[56] References Cited
UNITED STATES PATENTS

| | | | |
|---|---|---|---|
| 3,221,044 | 11/1965 | Hoch | 260/75 |
| 3,210,177 | 10/1965 | Hock | 106/15 |
| 3,236,659 | 2/1966 | Wygant et al. | 106/15 |
| 3,347,822 | 10/1967 | Jenkner | 260/45.75 |
| 3,422,047 | 1/1969 | Cannelongo | 260/45.7 |

Primary Examiner—Donald E. Czaja
Assistant Examiner—V. P. Hoke
Attorney—Norman C. Armitage et al.

[57] ABSTRACT

A polyester or polypropylene polymer containing a halogenated aromatic carboxylic acid ester. The polymers prepared in this manner exhibit improved flame retardant properties.

13 Claims, No Drawings

POLYMERS OF IMPROVED FLAME RETARDANCE

This application is a continuation-in-part of application Ser. No. 854,777, filed Sept. 2, 1969 now abandoned.

BACKGROUND OF THE INVENTION

This invention relates to improved polymers, and more particularly, to polyesters or polypropylenes which have been treated with a halogenated aromatic carboxylic acid ester.

Synthetic linear condensation polyesters have been known for some time and have attracted considerable commercial interest. They are usually prepared by ester interchange reactions between glycols and lower dialkyl esters of dicarboxylic acids such as terephthalic acid followed by polymerization at elevated temperature and pressure. These polyesters have been of particular interest in the preparation of filaments and fibers for the subsequent preparation of fabrics. One of the problems associated with these polyesters is the difficulty of dyeing the polyester to deep shades. Furthermore, even when it is possible to dye the polyester to provide some acceptable degree of color, the colors do not possess acceptable degrees of permanency.

The flammability of polyesters has, in recent years, generated considerable interest due to the increasing interest in the flameproofing of textile materials in general. Polyester fibers, for example, when subjected to a flame, fuse, melt and ignite. Although polyester fibers can be considered less flammable than some of the natural fibers, proper conditions can result in rapid burning of the fiber or fabric. Moreover, it has been noted that when polyester fibers are blended with other less flammable fibers (i.e., treated cotton), the less flammable fiber can act as a support for the molten polyester fiber allowing it to burn more vigorously. Therefore, blends of fibers can in some cases present a greater fire hazard than would a 100% polyester fabric.

It has been proposed to reduce the tendency of polyester and other fibers to burn by adding a flame-retarding agent. Many of these proposals have not been entirely successful since many of the compounds that would otherwise be good flame-retarding agents have a deleterious effect on the mechanical properties of the polyester.

SUMMARY OF THE INVENTION

These and other problems associated with polyester fibers have been overcome by treating the polyester fibers with halogenated aromatic carboxylic acid esters. Brominated and chlorinated aromatic dicarboxylic acid diesters have been found to be particularly useful for improving the flame-retarding and dyeing properties of polyester fibers. Such treated polyester fibers are not only flame-retardant, but also will accept a wide variety of dyes and provide deep shades otherwise unavailable on polyester fibers when dyed with exhaust dyeing procedures. Moreover, treatment of the polyester polymers in accordance with the process of the invention results in increased tensile strength of the polyester and of the fabrics produced from such treated polyesters. The flame retardance of polypropylene polymers and fibers also is improved by treatment in accordance with the process of the invention.

DESCRIPTION OF THE PREFERRED EMBODIMENTS

This invention involves treating polyesters or polypropylenes with a halogenated aromatic carboxylic acid ester. The synthetic linear condensation polyesters contemplated as useful in this invention are those formed from dicarboxylic acids and glycols, and copolyesters or modifications of these polyesters and copolyesters. In a highly polymerized condition, these polyesters and copolyesters can be formed into filaments, fibers, and the like, and subsequently oriented permanently by cold drying.

The polyesters and copolyesters specifically useful in the instant invention are those resulting from heating one or more of the glycols of the series HO(CH$_2$)$_n$—OH, in which n is an integer from 2 to 10, with one or more dicarboxylic acids or ester-forming derivatives thereof. Among the dicarboxylic acids and ester-forming derivatives thereof useful in the present invention there may be named terephthalic acid, isophthalic acid, sebacic acid, adipic acid, p-carboxyphenoacetic acid, succinic acid, p-p'-dicarboxybiphenyl, p,p'dicarboxycarbanilide, p,p'dicarboxythiocarbanilide, p,p'-dicarboxydiphenylsulfone, p-carboxyphenoxyacetic acid, p-carboxyphenoxypropionic acid, p-carboxyphenoxybutric acid, p-carboxyphenoxyvaleric acid, p-carboxyphenoxyhexanoic acid, p-carboxyphenoxy heptanoic acid, p,p'-dicarboxydiphenylmethane, p,p'-dicarboxydiphenylethane, p,p'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxyethane, p,p'-dicarboxydiphenoxypropane, p,p'-dicarboxydiphenoxybutane, p,p'-dicarboxydiphenoxypentane, p,p'-dicarboxydiphenoxyhexane, 3-alkyl 4-(beta-carboxy ethoxy) benzoic acid, oxalic acid, glutaric acid, pimelic acid, suberic acid, azelaic acid and the dioxy acids of ethylene dioxide having the general formula, $$HOOC—(CH_2)_n—O—CH_2CH_2—O—(CH_2)_n—COOH$$

wherein $n$ is an integer from 1 to 4, and the aliphatic and cycloaliphatic aryl esters and half esters, ammonium and amine salts, and the acid halides of the above-named compounds and the like.

Examples of the glycols which may be employed in preparing the polyesters include ethylene glycol, trimethylene glycol, tetramethylene glycol and decamethylene glycol, etc.

Polyesters derived from terephthalic acid and glycols such as 1,4-cyclohexane dimethanol are particular examples of polyesters which can be improved by the process of the invention. Polyethylene terephthalate, prepared from terephthalic acid and ethylene glycol is another readily available polyester. It has a relatively high melting point of about 250°–255°C. which makes it particularly desirable for the manufacture of filaments for textile applications. Such polyesters are commercially available under a variety of trade names such as Dacron from E. I. Du Pont de Nemours and Company, Fortrel from Celanese Corporation, Kodel from Eastman Kodak Company and Trevira from Hystron Corporation.

The halogenated aromatic carboxylic acid esters useful in the treatment of the polyesters and polypropylenes include the mono and polycarboxylic acid esters and can be derivatives of such aromatic acids as benzoic acid, phthalic acid (or anhydride) etc. Examples of the halogenated aromatic dicar-boxylic acid diesters would include those having the general formula

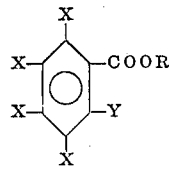

wherein X is a halogen and particularly bromine and chlorine, Y = halogen, hydrogen or COOR' wherein R' = H or R and R is an alkyl, aryl, hydroxy alkyl or hydroxy aryl radical containing up to about 20 carbon atoms.

The aromatic carboxylic acid esters represented by the above formula can be prepared from the corresponding anhydride. The phthalic anhydride can be converted to the simple diesters by conventional esterification methods, but with considerable difficulty. However, by using epoxides in the esterification reaction, diesters can be prepared with ease. In general, the halogenated phthalic anhydride is reacted with an alcohol or glycol to form the half-ester at a relatively low temperature such as from about 70° to 130°C. If higher temperatures are reached, decarboxylation occurs. Once the half-ester is prepared, it is then reacted with an epoxide to form a diester in accordance with the following reaction.

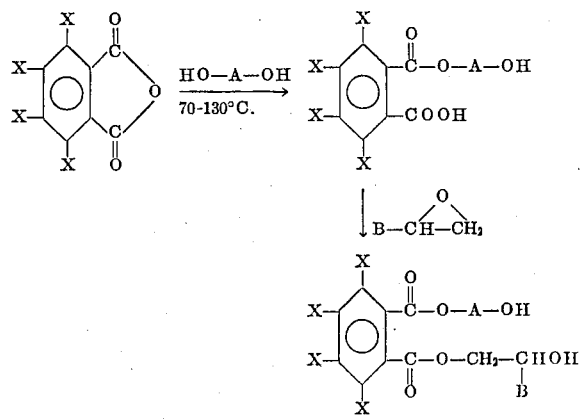

Alkaline or alkaline earth salt or alkyl ammonium salts are used as catalysts in the reaction. Sodium acetate is a commonly used catalyst. It is often desirable, since commercially available halogenated phthalic anhydrides contain residual sulfuric acid, to neutralize these commercial products with a slight excess of sodium acetate before the esterification reaction is begun. The presence of the excess sodium acetate is not harmful since it does act as a catalyst for the reaction. Magnesium oxide can also be used as a neutralizer and a catalyst.

A wide variety of alcohols and glycols can be used in the first step of the esterification reaction. Monohydric alcohols which can be employed in the esterification reaction include butanol, hexanol, heptanol, etc. Polyhydric alcohols ranging from diols to hexols also are useful. These include glycerine, ethylene glycol, dipropylene glycol, hexylene glycol, 1,2,6-hexanetriol, 1,4-cyclohexane dimethanol, trimethylene glycol, tetramethylene glycol, tetraethylene glycol, 1,10-decanediol, etc.

Generally, equimolar amounts of the anhydride and the hydroxy compound are employed in the reaction. The temperature of the reaction mixture will depend upon the particular hydroxy compound utilized. Thus when high molecular weight, high boiling polyols are utilized, higher reaction temperatures are feasible. As mentioned previously, the temperature of the reaction should not be so high that decarboxylation occurs resulting in the formation of a halogenated benzoic acid ester. However, mixtures of halogenated phthalic and benzoic esters have been found to be useful in improving the properties of the polymers.

Since many of the starting acids and anhydrides will be high molecular weight solids and it is undesirable to use an excess of the liquid hydroxy compound, it is desirable that the reaction be carried out in the presence of an inert solvent, such as toluene or trichlorethylene.

The halogenated aromatic carboxylic acid esters are applied to the polymers by any method which will result in the deposition of the ester within the polymer. Diffusion of the ester into the polymer is easily accomplished by heating the polymer for a period of time sufficient to enable the additive to diffuse into the polymer. The time and temperature required to effect the diffusion are interrelated, that is, at higher temperatures, the diffusion is more rapid, while at lower temperatures the polymer must be heated for an additional period. Generally, a treated polymer is heated for about one to three minutes at temperatures of about 210° to 225°C. Alternatively, the polyester or polypropylene can be heated for three to four hours at a temperature of about 140° —150°C. to effect diffusion.

Although the carboxylic esters can be applied to the polymer in any form, it is preferred that the polymer be in the form of staple, yarn, filament, or fabric since these forms are not generally subjected to elevated temperatures which would result in a decomposition of the carboxylic esters.

Fabrics which can be treated in accordance with the process of this invention include those fabrics comprising synthetic linear condensation polyesters or polypropylenes. The fabrics may be comprised entirely of polyester or polypropylene or blends thereof with one another or with other fibers, either natural or synthetic. The natural fibers may be cellulosic or keratinic, and these include, for example, cotton, wool, mohair, etc. Suitable synthetic fibers which may be utilized in combination with the polyester or polypropylene fibers in the preparation of fabrics include synthetic polymeric fibers, such as polyamides (e.g., polyhexamethylene adipamide), acrylics (e.g., polyacrylonitrile), other polyolefins and blends thereof. The fabrics may be in any form, such as woven, knitted, braided and felted, although woven fabrics are preferred. Examples of suitable fabrics include fabrics comprising 100% polypropylene; polypropylene blends; 100% polyester; 50% polyester and 50% cotton; 65% polyester and 35% cotton; 45% polyester and 55% cotton; and 55% polyester and 45% wool.

The halogenated aromatic carboxylic esters are applied to the polymer either neat or combined with a liquid carrier. Organic solvents are particularly preferred, and these include toluene, xylene, trichloroethylene, etc. The halogenated carboxylic esters and the liquid carrier, when utilized, can be applied to the polymer in any suitable manner, such as by padding, dipping, spraying and roller coating.

The amount of halogenated carboxylic acid ester incorporated into the polymer can vary depending upon the intended uses of the product and the properties desired. For example, where flame-retardant polyesters are desired, up to about 20% by weight based on the weight of the polyester, and preferably from about 9% to 20% of the diester is desirable. When improved dyeability is the main objective, lesser amounts of the additive can be diffused into the polyester to obtain the desired dyeability. When the aromatic carboxylic acid ester is applied to fabrics comprising blends of polyester or polypropylene fibers and other fibers, the amount of additive should relate to the amount of polyester or polypropylene in the fabrics.

When a flame-retardant fabric is the objective, and the fabric comprises a blend of polyester or polypropylene fibers and other fibers, it generally is desirable to treat the polyester or polypropylene fibers in accordance with the process of this invention and thereafter to treat the other fibers in accordance with processes known in the art. For example, cellulosic fibers can be flameproofed with a variety of phosphorus compounds, either alone or in conjunction with a variety of resins. For example, the use of tetrakis (hydroxymethyl) phosphonium chloride in conjunction with methylolated nitrogenous resins and tris (2,3-dibromopropyl) phosphate has been described in American Dyestuff Reporter, 57 Number 10, 40 (1968). Other treatments suggested in the prior art for flame-proofing cellulosic fibers and other fibers, such as woolen fibers, can be used in conjunction with the treatment of this invention.

The polymers treated in accordance with the process of this invention are characterized by improved flame-retardant properties. There are many tests utilized for determining the flammability of fabrics, and these range from the elementary to the sophisticated such as the Vertical Flame Test (AATCC Test Method 23-1966). A simple way of determining relative flammability of substances is to ignite the substance with a match or gas flame, remove the substance in the vicinity of the match or the flame, and thereafter determine the length of time which the substance sustains combustion. Alternatively, the length of charred substance can be observed.

The following examples illustrate the process and the product obtained in the process of this invention. Unless otherwise indicated, all parts and percentages are by weight.

Example A

A mixture containing 92.8 grams (0.2 mole) of tetrabromo phthalic acid anhydride, 35 grams (0.2 mole) of 1,10-decanediol and 0.6 grams of sodium acetate is heated at 180°C. for six hours with stirring under an atmosphere of nitrogen.

Samples of a 100% polyethylene terephthalate fabric are immersed in the above prepared material, removed and heated for 4 hours at 150°C. The fabric is then repeatedly rinsed with xylene until all of the surface adsorbed additive is removed. Fabrics prepared in this manner contain 13% by weight of the material based on the weight of the fabric. The treated fabric does not sustain combustion in either match or gas flame.

A sample of a polyester/cotton fabric containing 65% polyethylene terephthalate and 35% cotton is heated for three hours at 160°C. in the presence of the above prepared brominated additive and thereafter repeatedly washed with xylene to remove any surface additive. After drying, the fabric was found to have undergone an increase in weight of 9%. The cotton portion of this sample is then treated with a mixture obtained from a mixture of 60 grams of tetrakis (hydroxymethyl) phosphonium chloride, 6 grams of sodium hydroxide in 20 grams of water and 37 grams of ice, and a mixture of 8 grams of urea, 12 grams of Aerotex M-3 (a trimethylol melamine resin, 80% solids available from American Cyanamide Co.), 0.2 grams of a wetting agent and 57 grams of water. After immersion, the fabric is drained, air dried and cured for 5 minutes at a temperature of 163°C. The fabric is then subjected to boiling detergent for 5 hours (20 cc. Tide in 1 liter of water) and subjected to the 12 second vertical flame test after rinsing and drying (AATCC Test Method 23-1966). In this test, a sample of the fabric is clamped vertically over a source of the flame and maintained in this position for 12 seconds whereupon the flame is removed and the char length measured. The polyester/cotton fabric prepared above exhibited a char length of 3.5 inches which indicates a fire-resistant fabric.

Example B

A mixture of 9.75 pounds of tetrabromophthalic anhydride, 2 pounds of propylene oxide, 1.32 pounds of ethylene glycol, 0.09 pounds of sodium acetate and 24 pounds of trichloroethylene is heated and reacted to a temperature of 85°C. in an atmosphere of nitrogen for one hour. The mixture is then cooled to about 25°C. and filtered. The filtrate is a trichloroethylene solution of the desired aromatic diester.

A solution is prepared from 3 gallons of the diester solution prepared above and 8 gallons of additional trichloroethylene. A length of fabric comprising 65% polyethylene terephthalate and 35% cotton is passed continuously through the solution while the sides of the fabric are pinned on a conveyor, dried at 76°C. and thereafter passed through a direct, gas-fired oven maintained at a temperature of about 218°C. The residence time of the fabric in the oven is approximately 2 minutes and 15 seconds. The fabric prepared in this manner contained about 6% by weight of the diester.

The cotton portion of the above-treated fabric is flameproofed in the following manner. A solution is prepared from 60 parts of tetrakis (hydroxymethyl) phosphonium chloride, 6 parts of sodium hydroxide in 20 parts of water and 37 parts of ice. A second mixture is prepared from 8 parts of urea, 12 parts of Aerotex, M-3, 0.2 parts of a wetting agent and 57 parts of water. These two mixtures are combined slowly with stirring and pieces of the fabric are immersed in the mixture. The fabrics are removed from the mixture, allowed to dry and thereafter placed in an oven for 5 minutes at a temperature of about 160°C. The flame-retardant properties of this fabric are determined by subjecting the fabric to the vertical flame test (AATCC Test Method 23-1966). In this test, a strip (4 inch × 10 inch) of the treated fabric is clamped through a flame, which is removed after 15 seconds. The observer notes any after-flame, after-glow and the char length. When the above fabric was subjected to this test, there is no after-flame or after-glow in either the warp or fill direction, and there is a char length of 6 inches in the warp direction and 4.97 inches in the fill direction.

Several samples of the polyester/cotton fabric treated with the aromatic acid ester but not given the second treatment for flameproofing the cotton portion are immersed in boiling dye baths containing 3% of the following dyes based on the weight of the fabric and 0.5% of acetic acid.

| Treatment No. | Commercial Dye | Color Index No. |
|---|---|---|
| 1 | Polyester Blue GLF | Dispersed Blue 27 |
| 2 | Polyester Pink R-LSW | Dispersed Red 86 |
| 3 | Foron Navy S-2GL | Dispersed Blue 79 |
| 4 | Latyl Red Cerise D | Dispersed Red 59 |

After immersion in the bath for about 1 hour, the samples are rinsed with clear water and boiled in clear water for 5 minutes to remove any excess dye.

All the fabrics exhibit excellent dye pickup. The light-fastness of the dyed fabrics is determined by subjecting samples of the fabrics to xenon light for 20 to 40 hours and thereafter rating the exposed fabrics for light-fastness. A rating of 5.0 in this test indicates no loss of shade. The following results were obtained.

| Dye Treatment | Rating After 20 Hours | 40 Hours |
|---|---|---|
| 1 | 4.8 | 4.8 |
| 2 | 4.5 | 4.3 |
| 3 | 3.3 | 2.5 |
| 4 | 4.8 | 4.5 |

Example C

A portion of the brominated additive prepared according to the procedure of Example B is applied to a 100% woven polypropylene fabric. The treated fabric is dried at 76°C. and then heated for two hours at 140° – 150°C. The fabric is rinsed thoroughly with xylene to remove the surface adsorbed additive. The fabric does not sustain combustion in flame tests.

Example D

A portion of the brominated additive prepared according to the procedure of Example B is heated to evaporate the trichloroethylene. Ten grams of the dried additive are mixed with forty grams of polypropylene beads (Rexall 51N3) and the mixture stirred at 200°C. The resulting melt is then extruded through an orifice at 260°C. using an atmosphere of nitrogen at 50 psi. The resulting filaments are self-extinguishable on exposure to a flame.

The same results are obtained by adding the brominated additive to a polypropylene melt instead of mixing it with the polypropylene beads.

Example E

A mixture of 9.75 pounds of tetrabromophthalic anhydride, 1.32 pounds of ethylene glycol, 0.09 pounds of sodium acetate and 24 pounds of trichloroethylene is prepared, heated to a temperature of about 85°C. and 1.5 pounds of ethylene oxide is added to the mixture over a period of about 15 minutes while maintaining an atmosphere of nitrogen. After all of the ethylene oxide is added, the mixture is maintained at 85°C. for one hour and filtered. The filtrate is a desired diester solution.

Samples of a fabric comprising 55% polyethylene terephthalate and 45% wool (undyed) are immersed in the above prepared diester solution, air dried and thereafter dried in an oven for a period of about 1 minute at a temperature of about 182°C. The fabric is then washed in acetone to remove the surface or excess ester. About 3% by weight (of the fabric) of the diester is deposited in the fabric. The flame retardant properties of the treated fabric are determined utilizing the Horizontal Flame Test. In this test, the test sample is held horizontally over a flame until ignition occurs. After removing the flame, the burning time is recorded for those fabrics which ignite. The polyester wool fabric prepared above did not ignite when subjected to this horizontal flame test.

The results are the same when the fabric is dyed prior to treatment and when the fabric is prepared from yarns which have been dyed prior to weaving.

Example F

The procedure described in Example B for treating the polyester-cotton fabric with the aromatic dicarboxylic acid diester is repeated except that the fabric is not subjected to curing in the oven at 182°C. That is, the fabric is dried at 76°C. but not cured in the oven. This fabric is treated with a solution, diluted to 1000 ml. with water, obtained by combining a mixture containing 60 grams tetrakis (hydroxymethyl) phosphonium chloride, 6 grams of sodium hydroxide in 20 ml. of water and 37 grams of ice with a mixture of 8 grams of urea, 12 grams of Aerotex M-3, 0.2 grams of a wetting agent and 57 grams of water. After this treatment, the samples are cured in an oven at about 150°C. for 5 minutes.

Example G

A tetrabromophthalic anhydride diester is prepared by mixing 325 grams of tetrabromophthalic anhydride, 43.5 grams of ethylene glycol, 3 grams of anhydrous sodium acetate and 500 ml. of trichloroethylene, heating the mixture to approximately 86°C. and adding slowly, 70 grams of propylene oxide over a period of 90 minutes in an atmosphere of nitrogen. Approximately 250 ml. of the trichloroethylene is removed to produce a more concentrated form of the diester.

An emulsion of the diester is prepared by mixing 100 parts of water, 5 parts of wetting agent, 40 parts of the diester solution and 100 parts of toluene. The emulsion is prepared by adding the mixture of toluene and ester to the water containing wetting agent with vigorous stirring.

Samples of 100% polyethylene terephthalate fabric and a polyethylene terephthalate/cotton (65/35) fabric are immersed in the emulsion, air dried and thereafter dried in an oven at a temperature of about 220°C. for 2 minutes. After washing with acetone, the fabrics are weighed. The fabric is found to have increased in weight by 15.7%, and the polyester/cotton fabric exhibits a 10.1% increase in weight.

Samples of the two treated fabrics are dyed with the dyes indicated in the following table by immersing the fabrics in a boiling dye bath containing 3% dye (based on fabric) and 0.5% acetic acid. All samples are rinsed with clear water and boiled in clear water for 5 minutes to remove excess dye. The samples are then tested for light-fastness by subjecting the samples to zeon light for 20 and 40 hours. The results of the tests are reported in the following table. A rating of 5.0 in this test indicates no fading as a result of the test.

TABLE

Light-Fastness of Fabrics Treated with Diester

| Commercial Dye | Rating after 20 hours | Rating after 40 hours |
|---|---|---|
| Polyester/Cotton | | |
| Polyester Blue GLF | 4.8 | 4.5 |
| 100% Polyester | | |
| Polyester Blue GLF | 4.8 | 4.8 |
| Foron Navy S-2GL | 3.5 | 2.7 |
| Latyl Red Cerise-B | 4.7 | 4.3 |

Example H

A mixture of 143 grams (0.05 mole) of tetrachlorophthalic anhydride, 31 grams (0.5 mole) of ethylene glycol, 3 grams of sodium acetate and 500 ml. of trichloroethylene is prepared and heated to a temperature of 86°C. To this mixture there is slowly added 29 grams (0.5 mole) of propylene oxide for a period of 0.5 hour whereupon the mixture is cooled and filtered to remove the sodium acetate. The clear filtrate is a solution of the desired diester. An infrared spectrum of solution exhibits absorption bands of 2.95 microns for the OH group and a band of 5.75 microns for the ester carbonyl. No acid or anhydride is observed in the spectrum.

Samples of 100% spun polyester fabric are immersed in the above prepared solution of the diester, air dried and thereafter heated at a temperature of 220°C. 90–120 seconds. The fabric prepared in this manner is flame-retardant and ceases to burn when the source of flame is removed. The fabric also exhibits increased dye pickup to produce deeper shades than normal when immersed in a dye solution containing 3% of the dye based on the fabric weight and the small amount of acetic acid. No carriers are needed.

Example I

Samples of 100% spun polyester fabric are treated with a diester prepared in Example C to provide various levels of addition of the diester in the fabric. The flame-retardant properties of one set of samples are determined using the commonly called "candle test" as described by Fenimore and Martin in Combust. Flame, 10 (2), 135–139 (1966). This test involves measuring mixtures of oxygen and nitrogen having an oxygen content just capable of sustaining a burning flame. The so-called "oxygen index" is defined as n where $$n = [O_2]/[O_2] + [N_2]$$

Therefore, the smaller the $n$, the more flammable the specimen, the larger the $n$, the more retardant the specimen. Because the oxygen index for air is 0.21, a flame-retardant must raise the oxygen index of a material above this level before the material is self-extinguishing. By using this means of testing, it it possible to compare the relative effectiveness of two flame retardants even though they both give self-extinguishing ratings by other flame tests such as ASTM D 635-63. The results of the candle test on the above prepared fabric for different amounts of ester additive are summarized in the following table:

Oxygen Index Values on Polyesters

| Sample | OI Value |
|---|---|
| Control (no additive) | 0.203 |
| 4.5% additive | 0.215 |
| 10% additive | 0.224 |

The breaking strength of 100% polyester fabric is determined for several samples containing varying amounts of the additive. As can be seen from the results summarized in the following table, treatment of polyesters with the halogenated aromatic carboxylic acid esters of the invention in accordance with the invention results in improved tensile strength.

Tensile Strength of Polyesters

| % Additive | Tensile Strength (pounds) |
|---|---|
| 0 | 158.5 |
| 9 | 189.0 |
| 13 | 179.0 |
| 16 | 170.0 |

That which is claimed is:

1. A polyester or polypropylene polymer containing an acid ester having the general formula

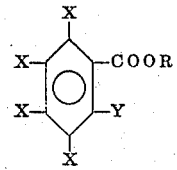

wherein X is a halogen, Y is halogen, hydrogen or COOR' wherein R' is H or R and R is an alkyl, aryl, hydroxy alkyl or hydroxy aryl radical containing up to about 20 carbon atoms, said polyester being derived from the reaction of an aliphatic glycol and an aromatic dicarboxylic acid or ester thereof.

2. The polymer of claim 1 wherein X in the acid ester is chlorine or bromine.

3. The polymer of claim 1 wherein R in the acid ester is a hydroxy alkyl radical.

4. The polymer of claim 1 wherein X in the acid ester is bromine, R is hydroxy alkyl and Y is COOR' wherein R' is a hydroxy alkyl radical.

5. The polymer of claim 4 wherein R in the acid ester is hydroxy ethyl and R' is hydroxy isopropyl.

6. The polymer of claim 1 wherein the polymer is a polyester.

7. The polymer of claim 1 wherein the polymer is a polypropylene.

8. A polyester- or polypropylene-containing fabric containing an acid ester having the general formula

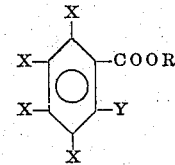

wherein X is a halogen, Y is halogen, hydrogen or COOR' where R' is H or R and R is an alkyl, aryl, hydroxy alkyl or hydroxy aryl radical containing up to about 20 carbon atoms, said polyester being derived from the reaction of an aliphatic glycol and an aromatic dicarboxylic acid or ester thereof.

9. The fabric of claim 8 wherein X in the acid ester is bromine, Y is COOR and R is a hydroxy alkyl radical.

10. The fabric of claim 8 wherein the fabric is impregnated with the acid ester.

11. The fabric of claim 8 wherein the acid ester is combined with the polymer from which the fibers of the fabric have been formed.

12. A polyester- and cotton-containing fabric having improved flame-retardant and dyeing properties impregnated with an acid diester having the general formula

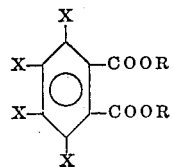

wherein X is chlorine or bromine and R is a hydroxy alkyl radical, and with a flame-retardant phosphorus composition, said polyester being derived from the reaction of an aliphatic glycol and an aromatic dicarboxylic acid or ester therof.

13. The fabric of claim 12 wherein the phosphorus composition is tetrakis (hydroxymethyl) phosphonium chloride.

* * * * *

UNITED STATES PATENT OFFICE
CERTIFICATE OF CORRECTION

Patent No. 3,775,165          Dated November 27, 1973

Inventor(s) Freeman M. Young (Deceased) by Mary M. Young et al.

It is certified that error appears in the above-identified patent and that said Letters Patent are hereby corrected as shown below:

Column 2, line 8, the word "discarboxylic" should read -- dicarboxylic --. Column 4, line 31, the word "polymer" should read -- polyester --. Column 9, line 12, change "0.05" to -- 0.5 --.

Signed and sealed this 23rd day of April 1974.

(SEAL)
Attest:

EDWARD M. FLETCHER, JR.
Attesting Officer

C. MARSHALL DANN
Commissioner of Patents